United States Patent

Brown et al.

[11] Patent Number: 5,149,427
[45] Date of Patent: Sep. 22, 1992

[54] CAP FOR UNDERDRAINS IN GRAVITY FILTERS

[75] Inventors: Marvin A. Brown, Sewickley; Gerald D. Wolfe, Zeliepnople; Richard P. Beverly, Butler, all of Pa.

[73] Assignee: The F.B. Leopold Company, Inc., Zelienople, Pa.

[21] Appl. No.: 679,947

[22] Filed: Apr. 3, 1991

[51] Int. Cl.$^5$ ............................................. B01D 24/22
[52] U.S. Cl. ..................................... 210/274; 210/275; 210/293
[58] Field of Search ................ 210/274, 275, 279, 293

[56] References Cited

U.S. PATENT DOCUMENTS

| | | | |
|---|---|---|---|
| 2,154,167 | 4/1939 | Ienks | 210/122 |
| 2,265,741 | 12/1941 | Morse | 210/130 |
| 2,378,239 | 6/1945 | Myron | 210/293 |
| 2,559,936 | 7/1951 | Buffle | 210/293 |
| 2,594,568 | 4/1952 | Lawlor | 210/145 |
| 2,855,364 | 10/1958 | Roberts | 210/35 |
| 3,263,813 | 8/1966 | Keller | 210/232 |
| 3,512,649 | 5/1970 | Nebolsine et al. | 210/274 |
| 3,556,299 | 1/1971 | Zievers et al. | 210/136 |
| 3,840,117 | 10/1974 | Ross | 210/80 |
| 3,954,620 | 5/1976 | Nebolsine | 210/293 |
| 4,065,391 | 12/1977 | Farabaugh | 210/274 |
| 4,098,695 | 7/1978 | Novotny | 210/85 |
| 4,118,322 | 10/1978 | San Roman | 210/274 |
| 4,208,288 | 6/1980 | Stannard et al. | 210/277 |
| 4,214,992 | 7/1980 | Sasano et al. | 210/274 |
| 4,619,765 | 10/1986 | Roberts | 210/293 |
| 4,707,257 | 11/1987 | Davis et al. | 210/274 |
| 4,923,606 | 5/1990 | Gresh et al. | 210/293 |

FOREIGN PATENT DOCUMENTS 63-178487 7/1988 Japan .
1134216 1/1985 U.S.S.R. .

Primary Examiner—Stanley S. Silverman
Assistant Examiner—Cynthia L. Nessler
Attorney, Agent, or Firm—Webb, Burden, Ziesenheim & Webb

[57] ABSTRACT

A cap for filter underdrain blocks is provided, wherein the cap has a porous body with a top surface, a bottom surface and downwardly extending flanges. The cap is installed on a filter block having a plurality of orifices in a top wall of the filter block for channelling fluids to and from an overyling filter media. The bottom surface of the cap along with the flanges define a distribution chamber above the orifices, and the cap has a porosity such that a fine grain filter media may be placed directly on the top surface of the cap without media penetrating therethrough and clogging the underdrain blocks. The distribution chamber enhances distribution of backwash fluids throughout the filter media, and the cap eliminates the need for a separate gravel support layer to be installed between the fine grain filter media and the underdrain blocks.

20 Claims, 3 Drawing Sheets

CAP FOR UNDERDRAINS IN GRAVITY FILTERS

BACKGROUND OF THE INVENTION

1. Field of the Invention

This invention relates to underdrains in gravity filters and, more particularly, to caps for underdrain blocks.

Gravity filters frequently employ underdrain systems or filter bottoms for collecting and channelling effluent away from the filter bed and also for distributing backwash fluids into the filter bed. Such a filter bottom is described in U.S. Pat. No. 4,065,391 to Farabaugh. The filter bottom usually includes several filter underdrain blocks arranged in several parallel rows across the filter bottom. The underdrain blocks provide the appropriate conduits and apertures for receiving effluent and discharging backwash fluids. Typically, the underdrain blocks have several apertures in the top wall of the blocks for this purpose.

It has been found desirable to employ larger apertures in the top wall of the blocks so that the apertures will not clog and inhibit flow to and from the filter bed. A problem with the larger apertures is penetration of fine grain filter media, such as sand, anthracite or granular activated carbon ("GAC"), through the apertures and into the underdrain blocks. This eventually clogs the underdrains, and the loss of filter media hinders the filtering capabilities of the bed. The present remedy for this problem is employment of a support gravel barrier between the fine grain filter media and the underdrain blocks. However, this solution has several problems.

First, the support gravel is very expensive and time consuming to install as it requires several individual layers of gravel. The gravel is laid down in an hour-glass configuration so that a marked gradation from larger gravel to smaller gravel and back to larger gravel is maintained. This support barrier generally consumes 12 inches of filter space, which is particularly a problem when retrofitting low-clearance filters with new, non-clogging underdrain blocks. Second, the gradation in the support barrier is subject to upset when "uncontrolled air" enters the underdrain and comes out the apertures in the top walls of the underdrain blocks. The uncontrolled air may result from defects in the installation of the air system, or from operator error during normal operation. Finally, in GAC installations, the GAC must be occasionally removed from the filter and placed in a reactivation furnace. The removal is typically accomplished by flooding, and in the flooding process, support gravel frequently mixes with the GAC and accompanies it into the reactivation furnace. At the high temperatures necessary to reactivate the GAC, over 1400° F., the gravel explodes and causes damage to the interior of the furnace.

FIG. 1 is a cross section of a prior art gravity filter A having a bottom wall B and two side walls C. Bottom wall B has a plurality of underdrain blocks D aligned end to end in several parallel rows across the bottom wall B. FIG. 1 shows one of these rows having four underdrain blocks D.

A filter bed E is placed on top of the underdrain blocks D within side walls C. Filter bed E includes a fine grain layer F and a support gravel layer G. The fine grain layer F may comprise sand, anthracite or GAC. The average diameter of the sand particles ranges from 0.25 to 0.50 mm., and that of the GAC ranges from 0.9 to 1.4 mm.

As noted above, the support gravel layer G is installed to keep particles from the fine grain layer F from draining into the underdrain blocks D. To accomplish this purpose, the support gravel layer G is installed in an hour-glass configuration, typically as follows:

2 inch depth of $\frac{3}{4}$ inch by $\frac{1}{2}$ inch gravel
2 inch depth of $\frac{1}{2}$ inch by $\frac{1}{4}$ inch gravel
2 inch depth of $\frac{1}{4}$ inch by $\frac{1}{8}$ inch gravel
2 inch depth of $\frac{1}{8}$ inch by #10 gravel
2 inch depth of $\frac{1}{2}$ inch by 1-$\frac{1}{4}$ inch gravel
2 inch depth of $\frac{3}{4}$ inch by $\frac{1}{2}$ inch gravel As stated, this layer is time consuming and expensive to install. Additionally, it consumes 12 inches of filter space and poses a significant head loss, which must be overcome to properly backwash the fine grain layer F.

2. Description of the Prior Art

U.S. Pat. No. 2,154,167 to Jenks entitled "Water Treatment" ("Jenks") discloses improvements in water treatment related to a sand filter bed under which a combined underdrain and distribution structure is located. The underdrain includes parallel channels separated from the bed by ceramic units having parallel ribs. The ceramic units are made from sintered, igneous materials, and they are said to have a permeability such that the head loss therethrough is small compared to the head loss through the conventional rapid sand filter system. A problem with the ceramic units is that their pores are easily calcified because the microscopic grains in these units have jagged, sharp edges. The sharp edges also tend to collect particulates both from the fluid being filtered and from the backwash fluid, further clogging the underdrain. Additionally, the rigidity of the ceramic units gives them a tendency to fail when clogged or subjected to uncontrolled high pressure "kicks". The ceramic units are also quite heavy and are thus difficult to handle.

A further problem with the ceramic unit underdrain disclosed in Jenks is its inherent inability to provide proper distribution of backwash fluids, particularly backwash gas. The nature of the manufacturing process makes it impractical to produce a ceramic unit of absolute uniform porosity so that head loss variations will be present across the continuum of the Jenks underdrain. Gas is very sensitive to such head loss variations, and when pumped into the underdrain under pressure, the gas will concentrate at locations of higher porosity (lower head loss) resulting in maldistribution of the gas into the filter bed.

The Jenks underdrain is further inhibited from properly distributing backwash fluids because it cannot practically be installed at true level. Typical underdrains vary as much as $\frac{1}{8}$ inch from level across the length of the underdrain. As a result, incoming backwash gas collects at the high end of the underdrain, and distribution into the filter bed is therefore uneven. This problem is enhanced by the fact that the channels in Jenks are in fluid communication across the full length of the underdrain. The only metering of gas which occurs is between the channels and the filter bed itself, through the pores of the ceramic units.

U.S. Pat. No. 3,840,117 to Ross entitled "Underdrain for Waste Effluent Filter and Method of Using Same" ("Ross") discloses an underdrain structure for a waste effluent filter having an air and liquid distributing device in the underdrain cavity. The underdrain supports a sand bed, and the underdrain includes a plate having a plurality of apertures therein. Above the plate are upper pockets, defined by rims in the form of a matrix of plastic bars. A mesh screen is placed between the filter media and the plate, and the screen rests on the rims to further define the upper pockets. A central support sleeve is located within each upper pocket to support the screen, and a grate rests on top of the screen. The filter bed does not include gravel support layers. The Ross underdrain is relatively complex and time consuming to install. The wire mesh screen is subject to calcification. The matrix of plastic bars, the support sleeves and the grate effectively shield backwash fluids from contacting a large portion of the filter bed. This creation of "dead spots" detracts from the useful life of the filter bed and promotes undesirable build-up of filtrate.

U.S. Pat. No. 4,208,288 to Stannard, et al. entitled "Filtering Apparatus" discloses a filtering apparatus having rigid filter plates encasing a secondary filter zone. The filter plates are made from organic resin matrix with anthracite aggregate.

Thus, it is an object of the present invention to provide a cap for underdrain blocks which resists calcification and which is easy to install, both on existing underdrain blocks or in combination with newly manufactured blocks. It is a further object of the invention to enhance distribution of backwash fluids evenly across the entire filter bed to avoid the development of dead spots within the filter bed wherein the bed is not adequately cleaned. It is a still further object of the present invention to eliminate the need for a separate layer of support gravel, thus providing added clearance above the filter bed, reducing installation costs and eliminating filter media contamination by support gravel. Finally, it is an object of the present invention to provide a porous underdrain barrier which has a head loss smaller than the support gravel layer which it replaces, thus reducing the energy required in backwash operations.

SUMMARY OF THE INVENTION

In accordance with the invention, a cap for filter underdrain blocks is provided wherein the cap comprises a porous, planar body having a top surface, a bottom surface, a first lateral edge, a second lateral edge, a front edge and a rear edge, with a flange extending downward from each edge to a plane below the bottom surface. A plurality of grooves are formed in the bottom surface, and means are included for securing the cap to a top wall of a filter underdrain block so that the bottom surface extends above a plurality of orifices in the top wall, with the flanges engaging the top wall. The top surface thus supports the filter media, and the bottom surface along with the flanges define a distribution chamber above the orifices.

The body of the cap is adapted to support a fine grain filter media without the media penetrating therethrough, and the pores in the body are preferably about 700-800 microns in size. The lower portion of each flange defines a sealant channel for receiving a sealing agent to seal a joint between the lower portion and the top wall, and the means for securing the cap to the top wall may comprise a plurality of screws extending through the projections, or the means may comprise magnetic induction fusion welds. The grooves in the bottom surface may be longitudinal and may extend the length of the body. The cap is preferably molded from sintered, polyethylene beads.

A capped filter underdrain block is also provided. The block has a top wall, a bottom wall and two side walls extending between the top wall and the bottom wall. The block has at least one conduit therethrough, and the top wall has a plurality of orifices in communication with that conduit. There are also a plurality of ribs on the top wall forming a grid having a plurality of sectors, each sector encompassing at least one of the orifices. The cap has a porous, planar resilient body with a top surface, a bottom surface, a first lateral edge, a second lateral edge, a front edge and a rear edge. The body of the cap has pores which are sized so that the body supports a fine grain filter media without the media penetrating therethrough.

Means for securing the cap to the top wall are also provided. When secured, the bottom surface engages the ribs and extends above the orifices in the top wall. The top surface supports the fine grain filter media. The bottom surface cooperates with the ribs to define a plurality of distribution chambers, each distribution chamber corresponding to one of the sectors. The means for securing the cap may also include a flange around the perimeter of the top wall, the flange engaging each edge on the cap. The ribs may be arranged so that each sector encompasses only one orifice, and the sectors may further be rectangular in shape.

DETAILED DESCRIPTION OF THE PREFERRED EMBODIMENTS

Figure 2:
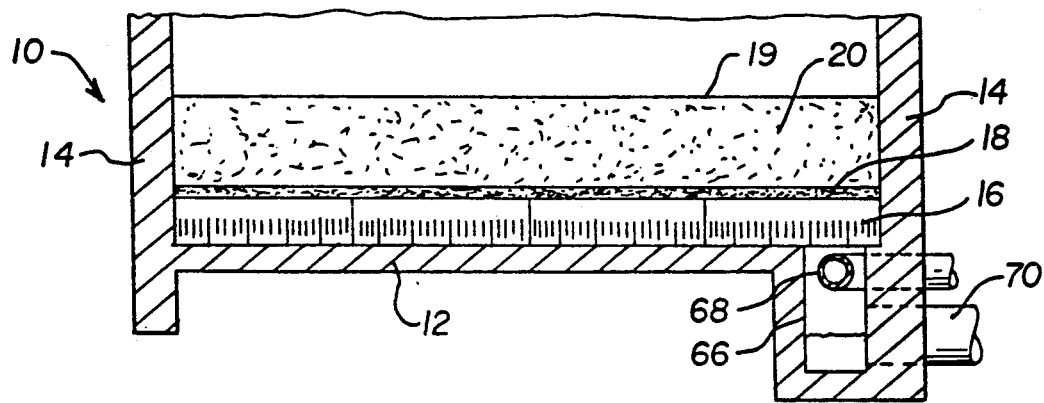
FIG. 2 is a sectional view of the gravity filter of FIG. 1 wherein the cap of the present invention has been installed on the filter underdrain blocks, and the gravel support layer has been eliminated.
Figure 3:
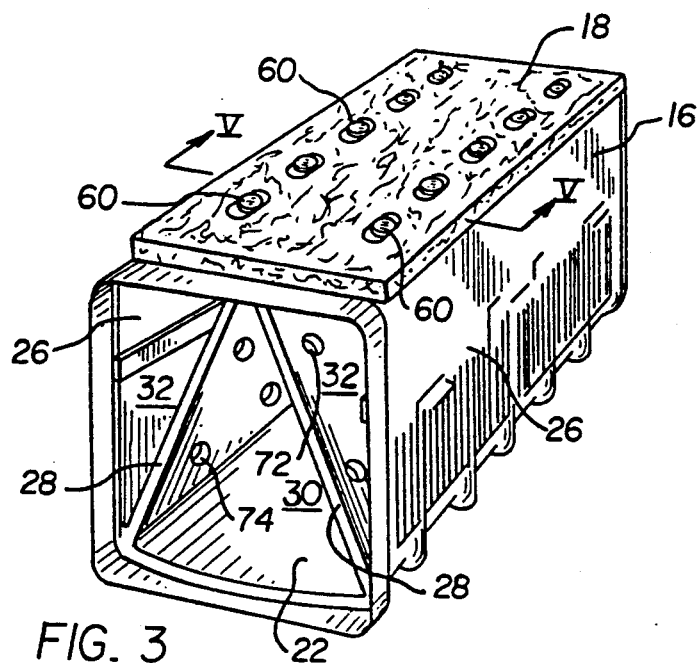
FIG. 3 is a perspective view showing a capped filter underdrain block in accordance with the present invention.
Figure 4:
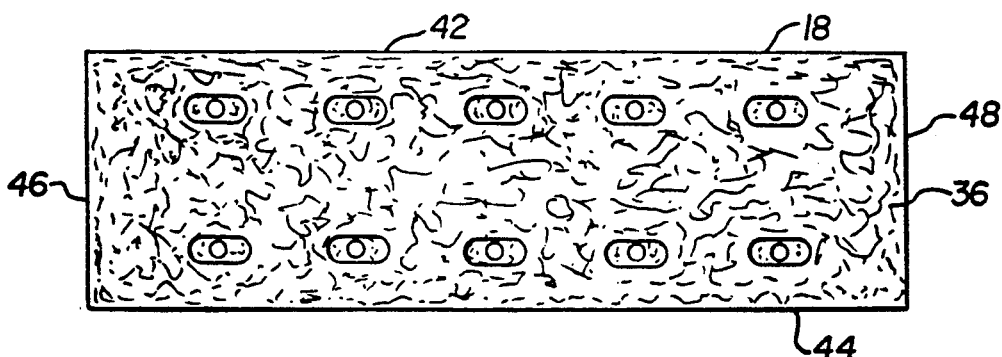
FIG. 4 is a top view of the cap of FIG. 3.

FIG. 2 shows a gravity filter 10 having a bottom wall 12 and two side walls 14. A plurality of underdrain blocks 16 are placed end to end in parallel rows across bottom wall 12. Further details about the configuration of underdrain block 16 and its placement in gravity filter 10 may be found in U.S. Pat. No. 4,065,391 to Farabaugh entitled "Fluid Distributor", incorporated herein by reference.

Figure 1:
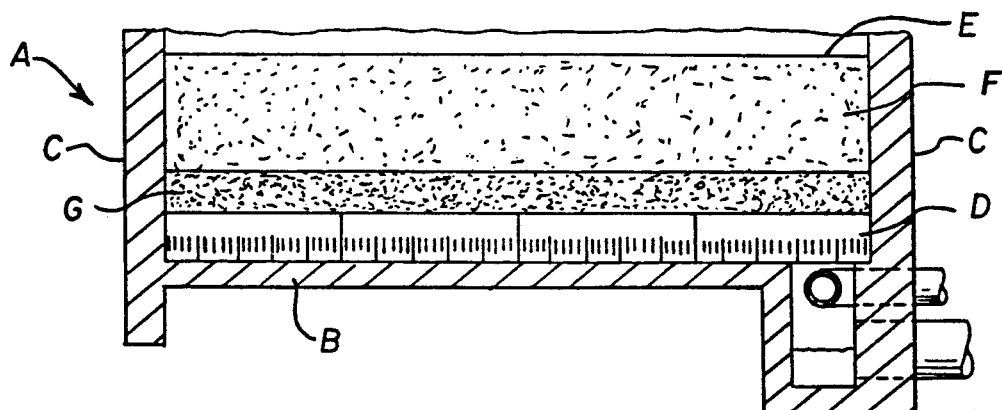
FIG. 1 is a sectional view showing a prior art gravity filter having a gravel support layer between a fine grain filter media and a plurality of filter underdrain blocks.

A cap 18 is secured to the top of each underdrain block 16 in accordance with the present invention. A layer 20 of fine grain filter media, such as sand, anthracite or granular activated carbon ("GAC"), is placed directly on top of the caps 18. Referring back to FIG. 1, it will be seen that the support gravel layer G shown therein is not included in the gravity filter 10 of FIG. 2. Thus, there is added clearance above the fine grain layer 20 in gravity filter 10. This is desirable for retrofitting shallow gravity filters, with new, non-clogging underdrain blocks, and it allows for added fine grain filter media thickness in larger gravity filters. As will be further detailed below, the media from the fine grain layer 20 will not drain through the caps 18 and into the underdrain blocks 16. Additionally, the caps 18 present a coherent, relatively smooth surface upon which to place the fine grain layer 20. In granular activated carbon ("GAC") filters, the surface characteristics of the cap allow the GAC to be completely flooded out of the gravity filter 10 for reactivation without any threat of contamination by support gravel.

Referring to FIGS. 3-6, an underdrain block 16 having a cap 18 installed thereon is shown. Underdrain block 16 has a bottom wall 22, a top wall 24 and two side walls 26 extending between bottom wall 22 and top wall 24. Underdrain block 16 also has two interior walls 28, and all six walls cooperate to define three conduits. Specifically, a primary lateral conduit 30 is defined, along with two secondary lateral conduits 32. It will be understood by those skilled in the art that the underdrain block 16 may be one of several configurations, but it generally has at least one conduit therethrough.

A plurality of orifices 34 are located in the top wall 24 of underdrain block 16 for receiving effluent from filter bed 19 when gravity filter 10 is operating in a downflow mode. The orifices 34 also serve to discharge a backwash fluid into the filter bed 19 when the gravity filter 10 is operating in an upflow mode. The upflow mode is typically initiated during a backwash cycle, which is instituted at predetermined periods of time in order to cleanse filtrate from the filter bed 19. Essentially, the entire filter bed is fluidized from beneath the bed via the underdrain conduits. The backwash fluid along with the cleansed filtrate is then drawn from the top of the filter bed 19. As an additional scouring technique, gas is introduced through the orifices 34 from underdrain blocks 16. The gas or liquid may be introduced alone or in combination with one another. The backwash cycle will be discussed in further detail below.

The cap 18 includes a porous, planar body 36 having a top surface 38, a bottom surface 40, a first lateral edge 42 and a second lateral edge 44. The cap also has a front edge 46 and a rear edge 48. A lateral flange 50 extends downward from each lateral edge 42, 44, with a front flange 52 extending from front edge 46 and a rear flange 54 extending from rear edge 48. Each flange 50, 52, 54 has a lower portion 55 which is in a plane below the bottom surface 40. Each lower portion 55 defines a sealant channel 56 for receiving polyurethane caulking to seal a joint 57 between the flanges 50, 52, 54 and the top wall 24 of the underdrain block 16.

The cap 18 is molded from sintered polyethylene beads, as provided by General Polymeric Corp. of West Reading, Pa. or Porex Technologies of Fairborn, Ga. The body 36 is thus resilient and has a thickness of approximately ½ inch while the flanges 50, 52 and 54 are 1 inch to 1-¼ inch thick. The pore size in cap 18 is approximately 700-800 microns so that the head loss of water pumped through 1 square foot of body 36 is approximately equal to 2 inches of water. The cap 18 is thus adapted to support a fine grain filter media, such as that in layer 20, on top surface 38 without the media penetrating therethrough.

Figure 5:
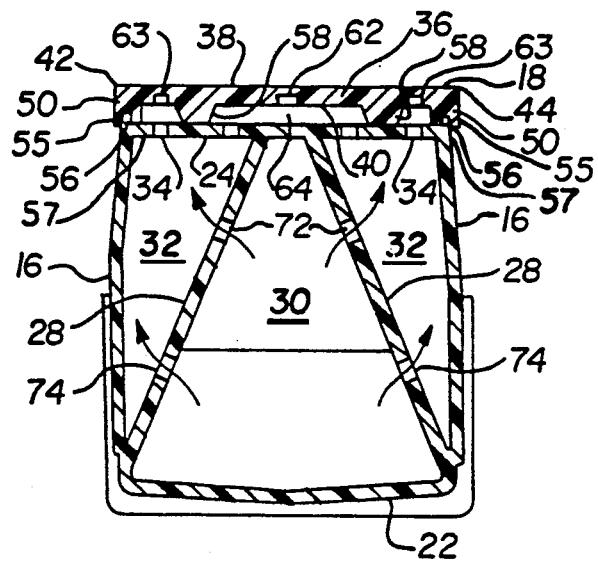
FIG. 5 is a cross section taken along lines V—V of FIG. 3.
Figure 6:
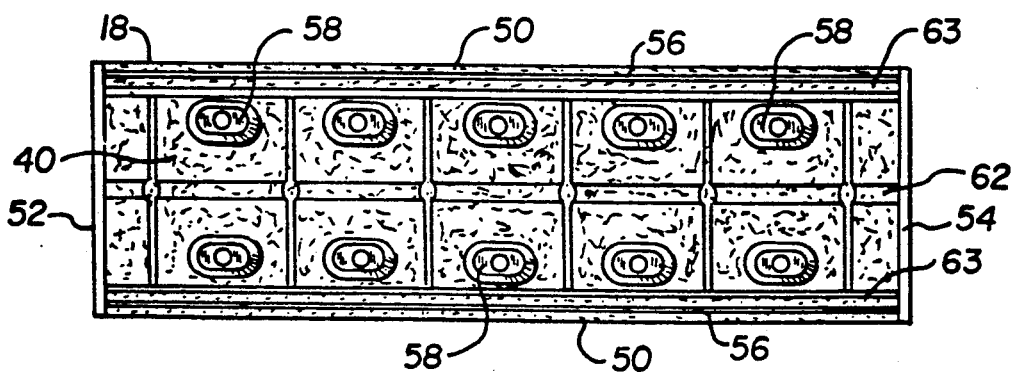
FIG. 6 is a bottom view of the cap of FIG. 4.

Referring to FIG. 5, a plurality of projections 58 extend downward from bottom surface 40. The cap 18 is placed on the underdrain block 16 so that projections 58 and flanges 50, 52 and 54 contact the top wall 24. The cap 18 may be secured to top wall 24 by self-tapping screws 60 which are placed through projections 58. The screws 60 are removable for subsequent inspection purposes. The screws 60, in combination with the caulking in sealant channels 56, are the preferred means for securing cap 18 to the underdrain block 16 when retrofitting existing installations. Alternatively, the cap 18 may be secured to the underdrain block 16 by magnetic induction fusion welds placed at various positions along the joint 57 between the flanges 50, 52 and 54 and top wall 24 and also on the bottoms of projections 58. This is preferred when the cap 18 is installed on the block 16 at the point of manufacture. The projections 58 also provide added support for body 36 in holding the filter bed 19 above the underdrain block 16.

The bottom surface 40 includes at least one groove formed therein. Preferably, three longitudinal grooves extend the entire length of body 36. A central groove 62 is about 1 inch wide and ⅛ inch deep. A pair of lateral grooves 63 are about ½ inch wide and ⅛ inch deep. Thus, the grooves 62, 63 are superficial and do not cut deeply into the bottom surface 40 of the cap 18. The grooves are formed directly in the cap 18 when the cap is being molded. The flanges 50, 52 and 54, bottom surface 40 and grooves 62, 63 define a distribution chamber 64 over the orifices 34 in top wall 24. As stated, the cap is sealed along sealant channels 56, thereby isolating each distribution chamber 64 above its respective block 16.

During the backwash cycle, gravity filter 10 is placed in the upflow mode by introduction of air and water into a flume 66, typically located adjacent to one of the sidewalls 14 of gravity filter 10. The air is introduced through a gas manifold 68 and the water is introduced through a water inlet 70. By these or similar means, air and water are introduced into the primary lateral conduit 30 of each row of underdrain blocks 16. The air is metered through a plurality of gas metering orifices 72, and the water is metered through a plurality of water metering orifices 74 located below the gas orifices 72. Both sets of orifices 72, 74 are located in the inclined walls 28 in equally spaced parallel rows. Air and water are thereby introduced into the secondary lateral conduits 32 where they intermix and then proceed upward through orifices 34 in top wall 24.

Proper distribution of backwash air is generally more difficult to achieve than for backwash water. Therefore, the remainder of the discussion regarding backwash fluids will focus on air and the effects of the present invention on distributing the air. After passing through top wall 24, the air enters distribution chambers 64, where it experiences a reduction in velocity and therefore stabilizes. Eventually, each distribution chamber 64 contains a roughly equal quantity of air at a given point in time. The grooves 62 and 63 provide smaller thicknesses in body 36 which present a lower head loss to the incoming air than is created by the bulk of body 36. The incoming air is drawn towards these grooves, but the fact that the grooves 62 and 63 extend the full length of cap 18 assures that the air is likewise distributed across the full length and width of the cap 18. Each isolated distribution chamber 64 distributes the incoming backwash air in this manner. As a result, distribution of backwash air into filter bed 19 is maximized, despite inherent deviations from level and variations in cap porosity.

Figure 7:
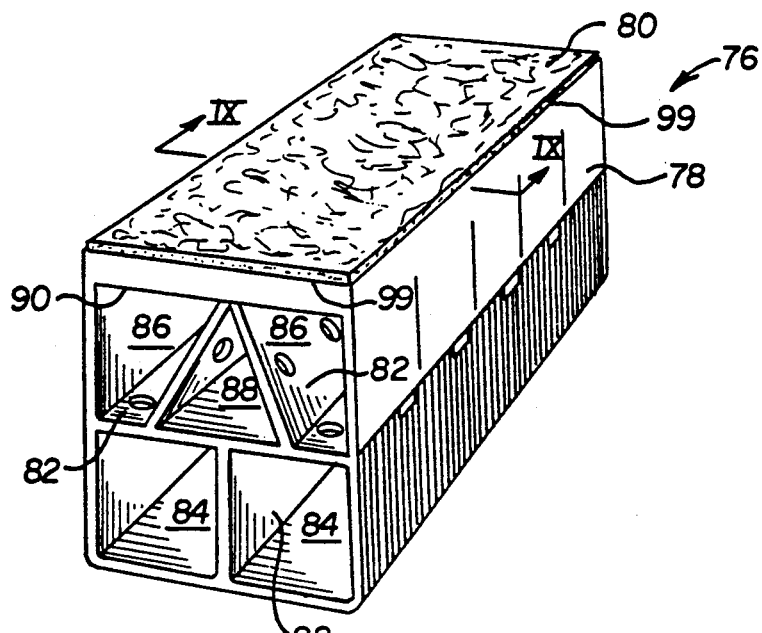
FIG. 7 is a perspective view showing a capped underdrain block in accordance with a second embodiment of the present invention.
Figure 8:
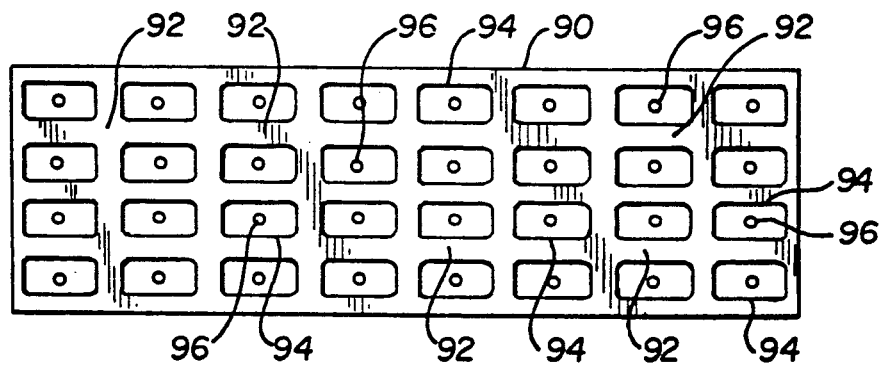
FIG. 8 is a top view of the underdrain block of FIG. 7 with the cap removed.
Figure 9:
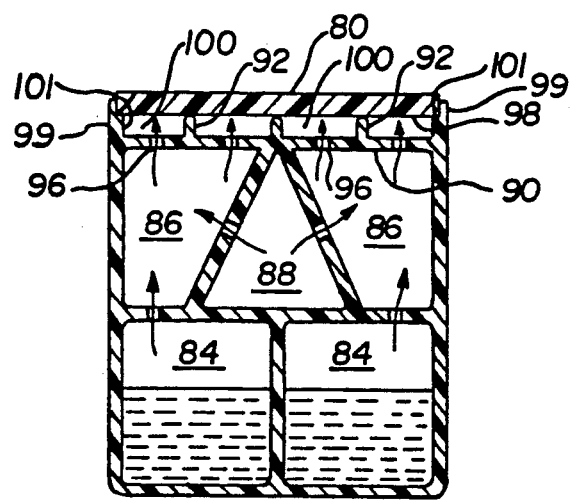
FIG. 9 is a cross section taken along lines IX—IX of FIG. 7.

Referring now to FIGS. 7-9, a second embodiment of the invention is shown. A capped filter underdrain block 76 has an underdrain block 78 with a recessed cap 80. The underdrain block 78 has a plurality of interior walls 82 whose configuration is different from that described in connection with the underdrain block 16 above. Generally, interior walls 82 define two lower primary conduits 84 and two upper secondary conduits 86. Additionally, a primary gas conduit 88 is disposed within upper secondary conduits 86. As was the case with the underdrain block 16 above, the present invention is not dependent upon the particular configuration of the interior walls 82.

The underdrain block 78 also has a top wall 90 having a plurality of raised ribs 92 thereon. The ribs are arranged to form a grid pattern with a plurality of sectors 94. Each sector 94 encompasses an orifice 96 located in top wall 90. Each orifice is in fluid communication with an upper secondary conduit 86. As shown in FIG. 8, sectors 94 are rectangular in shape, but they may also be circular, triangular or otherwise. Additionally, each sector 94 may encompass more than one orifice 96, and the ribs 92 need not all be contiguous.

Recessed cap 80 is placed on top of ribs 92 and secured to top wall 90 by means similar to those described in connection with the first embodiment of the invention. A bottom surface 98 of the recessed cap 80 contacts the tops of ribs 92 and cooperates with the ribs to form a plurality of distribution chambers 100, each distribution chamber corresponding to one of the sectors 94. A flange 99 extends upward around the perimeter of top wall 90, and the flange includes a boss 101 which extends inward and provides a bearing for the bottom surface 98 of cap 80. Thus, the cap 80 is easily aligned above top wall 90 when recessed within the flange 99.

During backwash, incoming backwash air enters each distribution chamber 100 through its corresponding orifice 96 where it is stabilized before permeating the cap 80. The ribs 92 ensure that minimum migration of backwash air occurs beneath the cap 80. The backwash air is successively subdivided, first when it exits primary gas conduit 88 and then when it exits the upper secondary conduits 86 through orifices 96 into the individual distribution chambers 100. This regulation of incoming air compensates for any inherent variations in porosity present in the cap 80 and for the underdrain's deviation from level. The creation of dead spots in the filter bed above cap 80 is thereby minimized.

The advantages derived from the present invention may be summarized as follows:

1. The separate layer of support gravel is eliminated;
2. The cap presents a lower head loss to incoming backwash fluids than the support gravel layer which it replaces;
3. Elimination of the support gravel layer provides added clearance above the filter bed which may be utilized by adding more filter media to the gravity filter and which facilitates installation of the non-clogging underdrain blocks in existing, low clearance filters;
4. The cap may be retrofitted on existing underdrain blocks or it may be included with newly manufactured blocks;
5. The material from which the cap is made has generally smooth, rounded particles, which do not calcify and which do not trap particulate matter within the cap;
6. The cap divides backwash air into fine bubbles, enhancing their scouring effect in the filter bed;
7. Distribution of backwash fluids into the filter bed is maximized by both the grooves in the first embodiment and the ribs in the second embodiment;
8. The top surface of the cap provides a relatively smooth, coherent surface upon which fine grain filter media may be directly installed without penetrating therethrough;
9. The top surface of the filter cap also allows GAC to be flooded out of the filter for reactivation without the threat of contamination by larger gravel;
10. The cap lifts the filter bed above the orifices in the underdrain blocks, exposing a greater area of the filter bed to each orifice, thus maximizing the distribution of backwash fluids into the filter bed;
11. The cap is easily removed for inspection or replacement;
12. The material from which the cap is made is uneffected by water treatment chemicals, including ozone; and
13. The cap is relatively lightweight and easy to handle.

Having described the presently preferred embodiments of the invention, it will be understood that it is not intended to limit the invention except within the scope of the following claims.

We claim:

1. In a filter system having a filter bottom with a plurality of underdrain laterals extending in parallel rows across said filter bottom and having a fine grain filter media supported on said underdrain laterals, the improvement comprising a cap for a filter underdrain block, said block having a plurality of orifices in a top wall for receiving effluent in a downflow mode from a filter media disposed above said block and for discharging a backwash fluid in an upflow mode into said filter media, said cap comprising:

a porous, planar body having a top surface, a bottom surface, a first lateral edge, a second lateral edge, a front edge and a rear edge;

a flange extending downward from each edge with a lower portion of each flange in a plane below said bottom surface;

at least one groove formed in said bottom surface; and means for securing said cap to the top wall of said block so that said bottom surface extends above said orifices, said flanges engage said top wall and said top surface supports said filter media;

said bottom surface and said flanges defining a distribution chamber above said orifices;

wherein said at least one groove defines a means for distributing said backwash fluid across an entire surface area of said cap.

2. The improvement of claim 1 wherein said body is adapted to support a fine grain filter media without said media penetrating therethrough.

3. The improvement of claim 2 wherein the pores in said body are approximately 700-800 microns in size.

4. The improvement of claim 1 wherein the lower portion of each flange defines a sealant channel for receiving a sealing agent to seal a joint between said lower portion and said top wall.

5. The improvement of claim 1 including three longitudinal grooves which extend the length of said body.

6. The improvement of claim 1 wherein said means for securing said cap to said top wall comprises a plurality of screws extending through said body.

7. The improvement of claim 1 wherein said means for securing said cap to said top wall comprises magnetic induction fusion welds.

8. The improvement of claim 1 including a plurality of projections extending downward from said bottom surface, said projections engaging said top wall and supporting the top surface of said cap when the cap is engaged on the underdrain block.

9. In a filter system having a filter bottom with a plurality of underdrain laterals extending in parallel rows across said filter bottom and having a fine grain filter media supported on said underdrain laterals, the improvement comprising a capped filter underdrain block for supporting said fine grain filter media and receiving effluent therefrom in a downflow mode while discharging a backwash fluid thereto in an upflow mode, said capped filter underdrain block comprising:

a block having a top wall, a bottom wall and two side walls extending between said top wall and said bottom wall, said block having at least one conduit therethrough, said top wall having a plurality of orifices in communication with said conduit for receiving said effluent and discharging said backwash fluid;

a cap having a porous, planar body, said body having a top surface, a bottom surface, a first lateral edge, a second lateral edge, a front edge and a rear edge, said body further having pores which are sized so that said body supports said fine grain filter media without said media penetrating therethrough;

a flange extending downward from each edge with a lower portion of each flange in a plane below said bottom surface;

at least one groove formed in said bottom surface; and means for securing said cap to the top wall of said block so that said bottom surface extends above said orifices, said flanges engage said top wall and said top surface supports said fine grain filter media;

said bottom surface and said flanges defining a distribution chamber above said orifices;

wherein said at least one groove defines a means for distributing said backwash fluid across an entire surface area of said cap.

10. The improvement of claim 9 wherein the pores in said body are approximately 700-800 microns in size.

11. The improvement of claim 9 wherein the lower portion of each flange defines a sealant channel for receiving a sealing agent to seal a joint between said lower portion and said top wall.

12. The improvement of claim 9 including three longitudinal grooves which extend the length of said body.

13. The improvement of claim 9 wherein said means for securing said cap to said top wall comprises a plurality of screws extending through said body.

14. The improvement of claim 9 wherein said means for securing said cap to said top wall comprises magnetic induction fusion welds.

15. The improvement of claim 9 including a plurality of projections extending downward from said bottom surface, said projections engaging said top wall and supporting the top surface of said cap when the cap is engaged on the underdrain block.

16. In a filter system having a filter bottom with a plurality of underdrain laterals extending in parallel rows across said filter bottom and having a fine grain filter media supported on said underdrain laterals, the improvement comprising a capped filter underdrain block for supporting said fine grain filter media and receiving effluent therefrom in a downflow mode while discharging a backwash fluid thereto in an upflow mode, said capped filter underdrain block comprising:

a block having a top wall, a bottom wall and two side walls extending between said top wall and said bottom wall, said block having at least one conduit therethrough, said top wall having a plurality of orifices in communication with said conduit for receiving said effluent and discharging said backwash fluid;

a plurality of ribs on said top wall forming a grid having a plurality of sectors, each sector encompassing at least one of said orifices;

a cap having a porous, planar body, said body having a top surface, a bottom surface, a first lateral edge, a second lateral edge, a front edge and a rear edge, said body further having pores which are sized so that said body supports said fine grain filter media without said media penetrating therethrough; and means for securing said cap to the top wall of said block so that said bottom surface engages said ribs and extends above said orifices and said top surface supports said fine grain filter media;

said bottom surface and said ribs defining a plurality of distribution chambers above said orifices, each distribution chamber corresponding to one of said sectors;

wherein said plurality of ribs define a means for distributing said backwash fluid across an entire surface area of said cape.

17. The improvement of claim 16 wherein said means for securing said cap comprises a flange extending upward around the perimeter of said top wall, said flange engaging said lateral, front and rear edges so that said cap is recessed within said flange.

18. The improvement of claim 17 including a boss on the inner surface of said flange, said boss providing a bearing for the bottom surface of said cap.

19. The improvement of claim 16 wherein said ribs are arranged so that each sector encompasses one orifice.

20. The improvement of claim 16 wherein said sectors are rectangular in shape.

* * * * *